N. KOCH.
GUN TO BE MOUNTED UPON AUTOMOBILES.
APPLICATION FILED AUG. 23, 1911.
1,029,303.
Patented June 11, 1912.
2 SHEETS—SHEET 1.
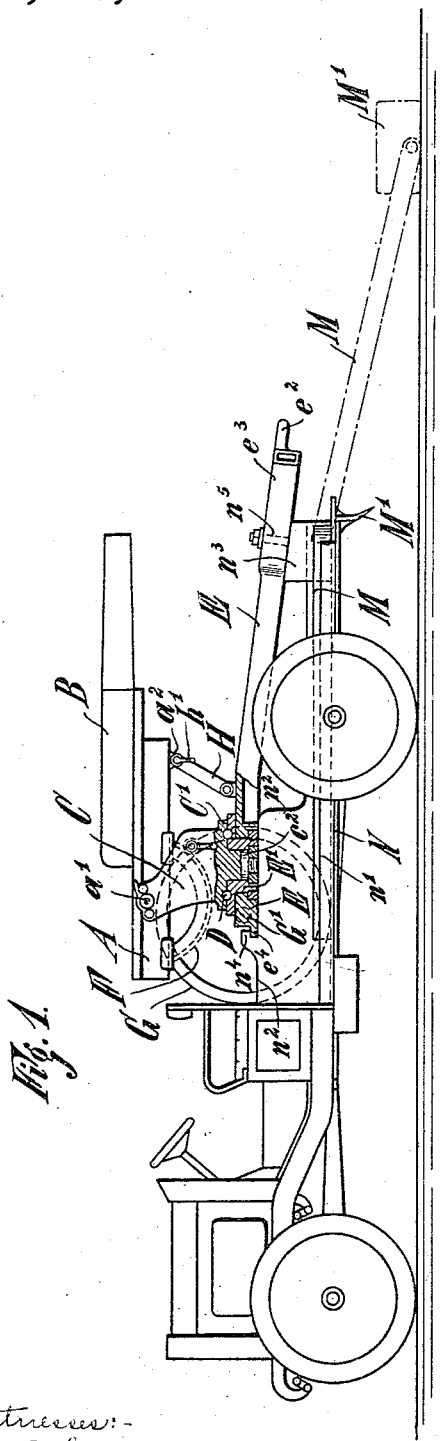
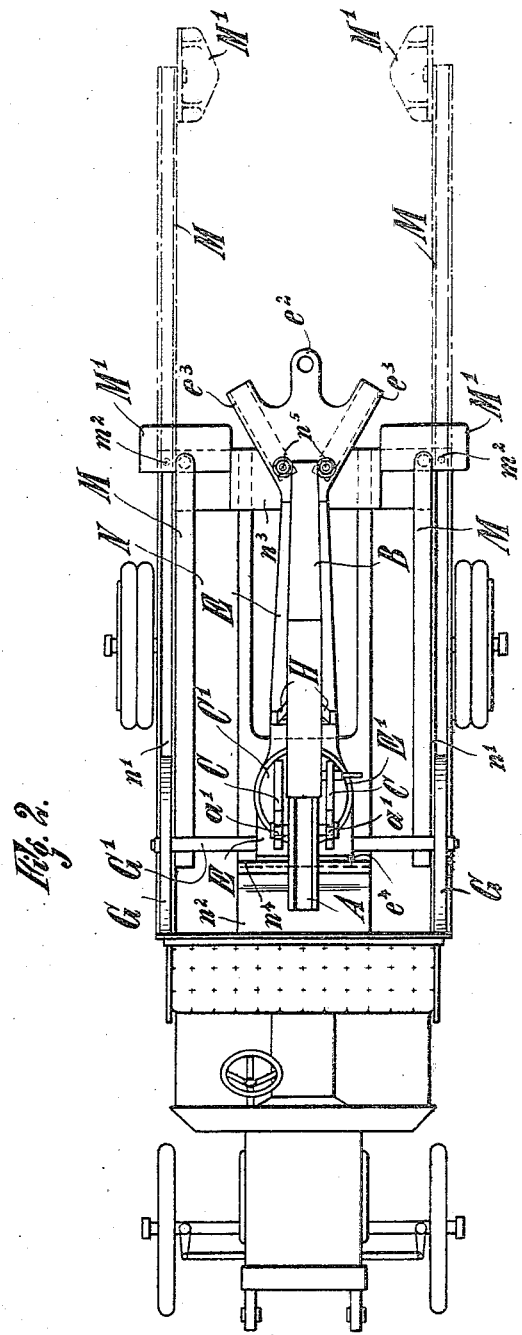

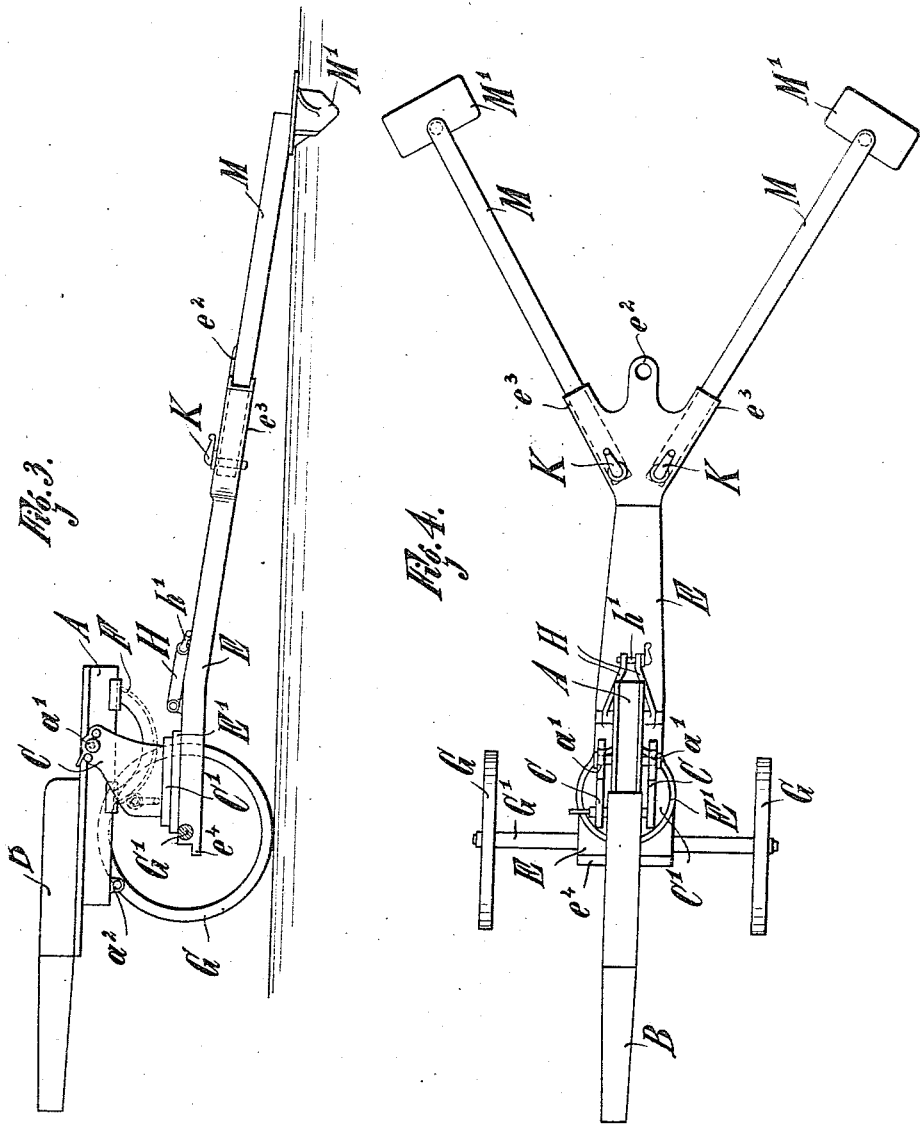

UNITED STATES PATENT OFFICE.

NORBERT KOCH, OF ESSEN-RELLINGHAUSEN, GERMANY, ASSIGNOR TO FRIED. KRUPP AKTIENGESELLSCHAFT, OF ESSEN-ON-THE-RUHR, GERMANY.

GUN TO BE MOUNTED UPON AUTOMOBILES.

1,029,303.

Specification of Letters Patent. Patented June 11, 1912.

Application filed August 23, 1911. Serial No. 645,556.

*To all whom it may concern:*

Be it known that I, NORBERT KOCH, a subject of the Emperor of Germany, and a resident of Essen-Rellinghausen, Germany, have invented certain new and useful Improvements in Guns to be Mounted upon Automobiles, of which the following is a specification.

This invention relates to improvements in guns to be mounted upon automobiles, particularly suitable for fighting rapidly moving targets such as air vehicles for example.

A constructional example of the subject matter of the invention is shown in the drawing in which—

Figure 1 is a side elevation, partly in section, of the automobile and the gun mounted thereon. Fig. 2 is the plan view corresponding to Fig. 1. Fig. 3 is a side elevation of the gun when in use as a traveling gun and Fig. 4 is the plan corresponding to Fig. 3.

The slide carrier A of the gun which guides the gun barrel B, is pivotally mounted in the upper carriage by means of the horizontal trunnions $a^1$. The upper carriage has two vertical cheeks C, which are united at the bottom into a turn table $C^1$. The turn table $C^1$ rests by means of a ring of balls D upon a bearing $E^1$ fixed in the under carriage E of the gun and works in the said bearing $E^1$ by means of a pivot pin $c^2$ see Fig. 1. Between the upper carriage C and the slide carrier A is interposed a toothed sector elevating gear, the toothed sector of which is lettered F, see Figs. 1 and 3. The upper carriage can be swung around relatively to the under carriage through an angle of 360 degrees by a traversing gear not shown in the drawing and which may be of any desired construction.

Upon the under carriage E is mounted the axle $G^1$ for the gun carriage wheels G. There is also pivoted to the under carriage a stirrup H which can be connected to an eye $a^2$ on the slide carrier by means of a key bolt $h^1$, when the parts are in the relative positions shown in Figs. 1 and 2.

Upon the rear end of the under carriage which is made in the form of a gun carriage trail, are mounted, in addition to the limber eye $e^2$ two lateral extensions $e^3$, in which, extension pieces M provided with a spade $M^1$ can be fixed by means of key bolts K.

Upon the platform N of the automobile are provided two ⊔-shaped rails $n^1$ for the gun carriage wheels G, and also two superstructures $n^2$, $n^3$ fitted if necessary for the reception of ammunition, tools and the like and upon which the gun with the under carriage can rest. The superstructure $n^2$ has a wide claw $n^4$ which can catch over a rib $e^4$ arranged on the front of the under carriage, while the latter is secured to the superstructure $n^3$ by bolts $n^5$. The extension pieces M for the under carriage are likewise ⊔-shaped in cross section, so as to enable them to be conveniently used as a ramp when transferring the gun to the automobile and when unloading the gun therefrom. For the same purpose the spades $M^1$ are rotatably attached to the one limb of the extension pieces M, so that they can be brought relatively to the extension pieces into the position shown in Figs. 1 and 2.

When the gun is to be transferred to the automobile, the pieces M are secured, by bolts $m^2$ for example (see Fig. 2), in such a position on the platform N of the automobile, that they form a continuation of the rails $n^1$ and rest with the spades $M^1$ upon the ground (see the position of the pieces M represented by dot and dash lines in Figs. 1 and 2). The gun is then pushed forward onto the pieces M and the rails $n^1$ until the rib $e^4$ on the under carriage catches under the claw $n^4$ on the superstructure $n^2$. Finally the gun is secured to the superstructure $n^3$ by the bolts $n^5$. The under carriage of the gun is then secured upon the automobile against all movement and the gun can be fired in all directions. While the gun is being carried about on the automobile the extension pieces M are laid upon the platform N, see the position of the pieces M represented in Figs. 1 and 2 by full lines. Then when the gun barrel and slide carrier point in such a direction that the muzzle of the gun barrel lies above the under carriage, the stirrup H is connected by the key bolt $h^1$ to the eye $a^2$ of the slide carrier. The gun barrel, the slide carrier and the upper carriage C $C^1$ are then lashed, that is to say the pointing and laying gears of the gun are relieved from any shocks which may arise when the gun is on the march. The way in which the gun is unloaded from the automobile requires no explanation after that which has already been given.

If the gun is to be set up on the ground separately from the automobile, the extension pieces M are attached to the under carriage E by the key bolts K in the manner shown in Figs. 3 and 4. The gun can then be fired with adequate stability within a large field of traverse.

I claim:

1. In a combined automobile and field mounting for guns, the combination with a gun barrel, a wheeled gun trail and an automobile; of a cross head supporting the gun barrel, said cross head being pivoted on the trail and adapted to turn with the gun barrel on said trail for training through an angle of 360°.

2. In an automobile mounting for guns, the combination with a gun barrel, a wheeled gun trail and an automobile, of means for rigidly securing said trail on the automobile comprising a jaw on the automobile, a lip on the trail adapted to engage said jaw, and a trail supporting block on said automobile having securing bolts for the trail.

3. In an automobile mounting for guns, the combination with a gun barrel, a wheeled gun trail and an automobile; of extension pieces for the trail adapted to form wheel tracks for the trail to facilitate the running up of the gun carriage onto the automobile said tracks being detachable from the automobile.

4. In an automobile mounting for guns, the combination with a gun barrel, a wheeled gun trail and an automobile; of a slide carrier, a cross head supporting said slide carrier and gun barrel; locking means between said trail and said slide carrier comprising a stirrup hinged to the trail, an eye on said slide carrier and a locking bolt for securing said stirrup to the slide carrier.

5. In an automobile mounting for guns, the combination with a gun barrel, a wheeled gun trail and an automobile; of a cross head supporting the gun barrel, said cross head being pivoted on the trail and adapted to turn thereon with the gun barrel for training through an angle of 360°, means on the automobile and on said trail for rigidly securing the latter on the automobile.

6. In an automobile mounting for guns, the combination with a gun barrel, a wheeled gun trail and an automobile; of a cross head supporting the gun barrel, said cross head being pivoted on the trail and adapted to turn thereon with the gun barrel for training through an angle of 360°, a jaw on the automobile, a lip on the trail adapted to engage said jaw, and a trail supporting block on said automobile having securing bolts for said trail.

7. In an automobile mounting for guns, the combination with a gun barrel, a wheeled gun trail and an automobile; of a slide carrier, a cross head supporting said slide carrier and the gun barrel, said cross head being pivoted on the trail and adapted to turn thereon with the gun barrel for training through an angle of 360°, securing means between said trail and said slide carrier situated in such a manner, that in the secured position the muzzle of the gun barrel lies above the trail.

8. In an automobile mounting for guns, the combination with a gun barrel, a wheeled gun trail and an automobile; of a slide carrier, a cross head supporting said slide carrier and the gun barrel, said cross head being pivoted on the trail and adapted to turn thereon with the gun barrel for training through an angle of 360°, securing means between said trail and said slide carrier situated in such a manner, that in the secured position the muzzle of the gun barrel lies above the trail, means on the automobile and on said trail for rigidly securing the latter on the automobile, and of extension pieces for the trail to facilitate the running up of the gun carriage onto the automobile.

The foregoing specification signed this 5th day of August, 1911.

NORBERT KOCH. [L. S.]

In presence of—
ALBERT F. NUFER,
L. NUFER.